United States Patent
Bhandari et al.

(10) Patent No.: US 11,236,999 B1
(45) Date of Patent: Feb. 1, 2022

(54) LOW POWER INERTIAL SENSOR ARCHITECTURE AND METHODS

(71) Applicant: mCube, Inc., San Jose, CA (US)

(72) Inventors: Sanjay Bhandari, San Jose, CA (US); Chia-Din Ting, San Jose, CA (US)

(73) Assignee: mCube, Inc., San Jose, CA (US)

( * ) Notice: Subject to any disclaimer, the term of this patent is extended or adjusted under 35 U.S.C. 154(b) by 225 days.

(21) Appl. No.: 16/566,793

(22) Filed: Sep. 10, 2019

Related U.S. Application Data (60) Provisional application No. 62/729,358, filed on Sep. 10, 2018.

(51) Int. Cl.
*G01C 19/56* (2012.01)
*G01C 19/5656* (2012.01)
*G01C 19/5649* (2012.01)

(52) U.S. Cl.
CPC ..... *G01C 19/5656* (2013.01); *G01C 19/5649* (2013.01)

(58) Field of Classification Search
None
See application file for complete search history.

(56) References Cited

U.S. PATENT DOCUMENTS

| | | | |
|---|---|---|---|
| 2010/0307241 A1* | 12/2010 | Raman | G01C 19/56 73/504.12 |
| 2013/0263641 A1* | 10/2013 | Opris | G01C 19/5776 73/1.38 |
| 2014/0167789 A1* | 6/2014 | Cagdaser | G01C 19/5726 324/683 |
| 2015/0276407 A1* | 10/2015 | Bhandari | G01C 19/5776 73/504.12 |

* cited by examiner

*Primary Examiner* — Paul M. West
*Assistant Examiner* — Mark A Shabman
(74) *Attorney, Agent, or Firm* — Richard T. Ogawa; Ogawa P.C.

(57) ABSTRACT

A controller for a MEMS gyroscope includes a first portion for generating a drive signal in response to an output from drive capacitors of the MEMS gyroscope, wherein the output signal has a resonant frequency and a phase, a second portion for determining a sampling signal in response to the output, wherein the sampling signal has a frequency that is a multiple of the resonant frequency, and has the phase, a multiplexer for outputting a multiplexed data comprising first data signals from first capacitors and second capacitors of the MEMS gyroscope multiplexed in response to the sampling signal, and a processing portion for reducing the resonant frequency from the multiplexed data.

20 Claims, 3 Drawing Sheets

LOW POWER INERTIAL SENSOR ARCHITECTURE AND METHODS

CROSS-REFERENCE TO RELATED APPLICATIONS

This application is a non-provisional of Provisional App. No. 62/729,358 filed Sep. 10, 2018 and is incorporated by reference for all purposes.

BACKGROUND

The present invention relates to motion detection. More specifically, the present invention relates to methods and apparatus having low power consumption for motion detection.

The inventors of the present invention have utilized micro-electro-mechanical system (MEMS) devices to help determine how a hand-held or wearable device is moved in space. One such MEMS device includes a MEMS gyroscope, that provides accurate x, y and z rotation (panning direction) data. The inventors, however, have determined that MEMS gyroscopes have drawbacks, including that they consume a relatively high amount of power. This high-power consumption greatly limits use of MEMS gyroscopes in low power applications and devices, such as in handheld devices, wearable devices, and the like.

In light of the above, what is desired are improved methods and apparatus motion direction detection with reduced drawbacks.

SUMMARY

Embodiments of the present invention are directed towards a device with motion detection capability. More specifically, the present invention relates to a device incorporating a MEMS gyroscope having low power consumption.

The inventors of the present invention have developed technologies for MEMS gyroscopes incorporating analogy control circuitry to provide high performance MEMS devices. Based upon the inventors' studies of their systems, the inventors now recognize that a more efficient hardware and power optimization can be implemented for Gyroscope operation. Accordingly, portions of the MEMS gyroscope control circuitry can now be performed using digital circuitry, that reduces power consumption of the MEMS gyroscope and provides additional functionality.

In some embodiments of the present invention, a MEMS based gyroscope includes a feedback mechanism that helps the MEMS based gyroscope resonate at a pre-determined resonance frequency. In various embodiments, as the MEMS gyroscope vibrates, the capacitance of the capacitor plates of the MEMS gyroscope changes, and a voltage signal is output based from the changes in capacitance. The voltage signal is then digitized using an analog to digital converter. Once in the digital domain, various functions may be performed, including determining an appropriate gain factor for the driving voltage signal; including determining a phase for the voltage signal (provided by phase lock loop functionality); and the like. After such operations are performed a digital signal representing a driver voltage is determined, and an analog driving voltage is output from a digital to analog converter. The analog driving voltage is then input into the MEMS gyroscope to help keep the MEMS gyroscope resonating at a predetermined frequency.

According to one aspect, an integrated MEMS device is disclosed. A device includes a MEMS gyroscope including a proof mass, a plurality of drive capacitors coupled to the proof mass, wherein the plurality of drive capacitors is configured to receive a drive signal, wherein the plurality of drive capacitors is configured to cause the proof mass to resonate in response to a drive signal, and configured to output a signal, wherein the output signal is characterized by a resonant frequency and a first phase, and a plurality of sense capacitors coupled to the poof mass including a first set of sense capacitors configured to output first data associated with a first rotational axis and a second set of sense capacitors configured to output second data associated with a second rotational axis, both in response to physical perturbations to the integrated MEMS device, wherein the first data comprises movement data characterized by the resonant frequency and a data frequency. An apparatus includes CMOS circuits coupled to and disposed below the MEMS gyroscope, wherein the CMOS circuits includes a first portion coupled to the plurality of drive capacitors, wherein the first portion is configured to generate the drive signal in response to the output signal, and a second portion coupled to the plurality of drive capacitors, wherein the second portion is configured to determine a sampling signal in response to the output signal, wherein the sampling signal is characterized by a sampling frequency that is a multiple of the resonant frequency, and wherein the sampling signal is characterized by the first phase. The CMOS circuits may include a multiplexer coupled to the first set of sense capacitors, the second set of sense capacitors, and the second portion, wherein the multiplexer is configured to output multiplexed data comprising the first data and the second data time multiplexed in response to the sampling signal, and a processing portion coupled to the multiplexer and to the second portion, wherein the processing portion is configured to reduce the resonant frequency from the multiplexed data and output processed data comprising the first data and the second data time multiplexed in response to the sampling signal.

According to another aspect a controller for a MEMS gyroscope is disclosed. One apparatus may include a first portion coupled to a plurality of drive capacitors of the MEMS gyroscope, wherein the first portion is configured to generate the drive signal in response to an output signal from the plurality of drive capacitors, wherein the output signal is characterized by a resonant frequency and a first phase, and a second portion coupled to the plurality of drive capacitors, wherein the second portion is configured to determine a sampling signal in response to the output signal, wherein the sampling signal is characterized by a sampling frequency that is a multiple of the resonant frequency associated with the plurality of drive capacitors, and wherein the sampling signal is characterized by the first phase. A device may include a multiplexer coupled to a first set of sense capacitors of the MEMS gyroscope, a second set of sense capacitors of the MEMS capacitor and the second portion, wherein the multiplexer is configured to output a multiplexed data signal comprising first data signals from the first set of sense capacitors and second data signals from the second set of sense capacitors multiplexed in response to the sampling signal, and a processing portion coupled to the multiplexer and to the second portion, wherein the processing portion is configured to reduce the resonant frequency from the multiplexed data and configured to output processed data signals comprising the first data signals and the second data signals time multiplexed in response to the sampling signal.

According to yet another aspect, a method for a controller for a MEMS gyroscope is disclosed. One technique includes generating with a first portion a drive signal characterized by a resonant frequency and a first phase, in response to an output signal from a plurality of drive capacitors of the MEMS gyroscope, applying with the first portion the drive signal to an input of the plurality of drive capacitors of the MEMS gyroscope, and determining with a second portion a sampling signal characterized by a sampling frequency and the first phase, in response to the output signal from the plurality of drive capacitors, wherein the sampling frequency is a multiple of the resonant frequency. A process may include receiving in a multiplexer first data signals from a first set of sense capacitors of the MEMS gyroscope, second data signals from a second set of sense capacitors of the MEMS capacitor, and the sampling signal, outputting from the multiplexer multiplexed data signals characterized by a time multiplexed output comprising a portion of the first data signals and a portion of the second data signals, and reducing with a processing portion the resonant frequency from the multiplexed data and output processed data comprising the first data and the second data time multiplexed in response to the sampling signal.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION

Figure 1:
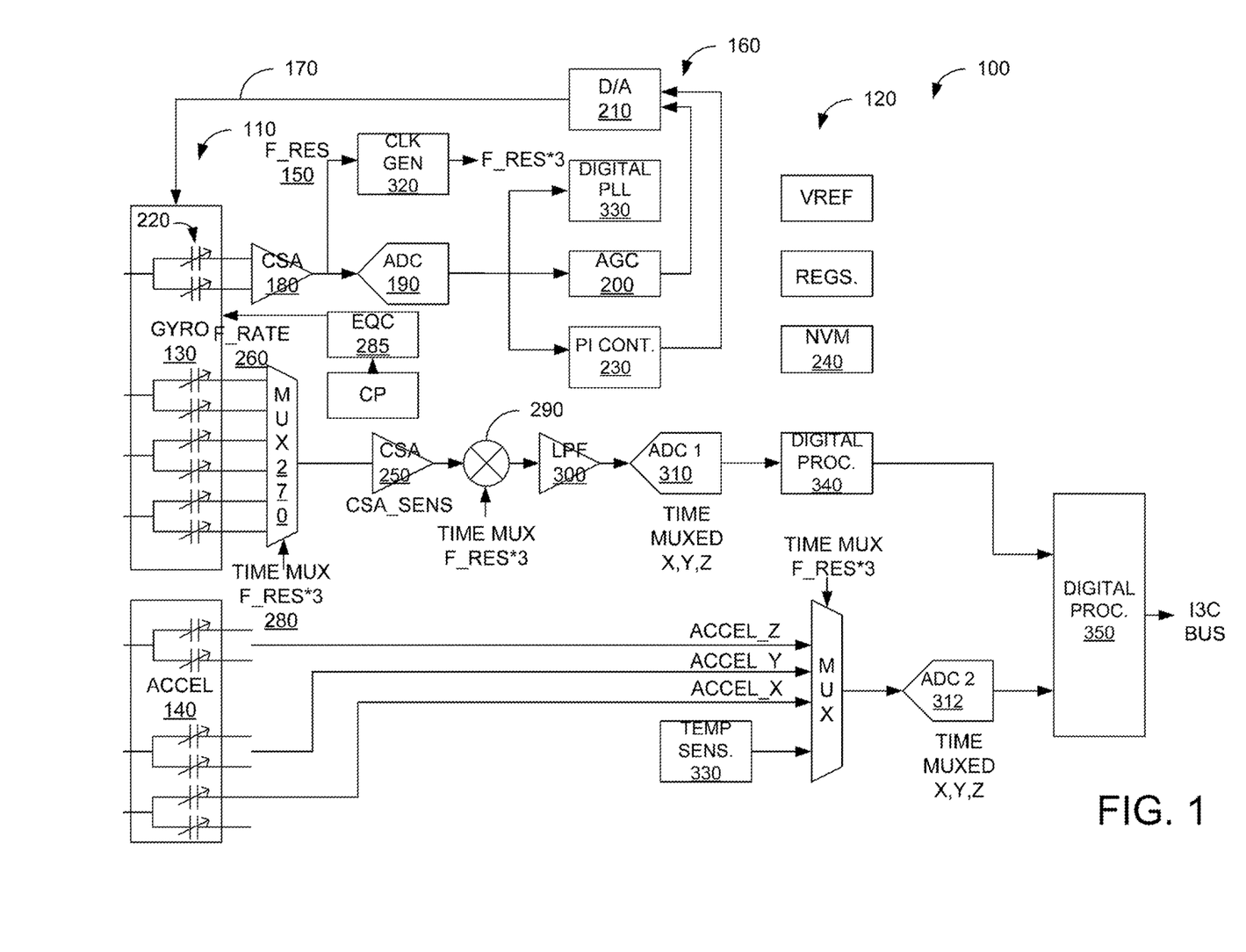
FIG. 1 is a block diagram of various embodiments of the present invention.

FIG. 1 illustrates an embodiment of a MEMS device. More specifically, FIG. 1 illustrates an architecture, design inventions in 6-Axis Gyroscope & Accelerometer architecture and signal processing.

In FIG. 1, the following acronyms are used: CSA: Charge Sense Amplifiers. These are used for processing signal from drive path as well as sense path of Gyroscope; ADC: A/D converter; DAC: D/A converter; LPF: Low Pass filter; I3C: serial bus communication to digital registers on the chip; PI Controller: Proportional, Integral, Derivative controller; PLL: Phase Locked Loop; NVM: Non Volatile Memory; Mux: Multiplexer; LPF: low pass filter; VREF: reference voltage; CP: charge pump; EQC: electrostatic quadrature cancellation; DIGITAL PROC: digital processor; CLK GEN: clock generator.

As shown in the embodiment in FIG. 1, a single or multi-axis MEMS gyroscope system 100 is provided including a MEMS portion 110 and a CMOS control portion 120. A MEMS gyroscope element 130 is configured to determine rotation in one or more of the x-axis, y-axis, and z-axis. Additionally, a single or multi-axis MEMS Accelerometer element 140 is also provided, that can determine acceleration in one or more of the x-axis, y-axis, and z-axis. In various embodiments, the MEMS portion includes a proof mass and MEMS sensing elements that may be capacitive but in other embodiments, other types of sensing elements are also possible, and other types of amplifier interfaces are envisioned.

In various embodiments, the MEMS gyroscope proof mass and element 130 is designed to resonate at a given frequency (frequency_resonating or F_RES 150) and amplitude. To facilitate this resonance, a drive element 160 is coupled to the MEMS gyroscope element 130 that provides a drive signal 170 at a desired frequency and amplitude. To maintain this oscillation of MEMS element, a drive loop, providing signal feedback is illustrated. In various embodiments, a drive loop may include a charge sense amplifier 180 and charge sense amplifier driver signal (CSA, CSA_DRV), an analog to digital converter (ADC) 190, an automatic gain controller (AGC) 200 and a digital to analog converter (DAC) 210 to determine a gain of a signal at desired resonant frequency of oscillation.

In operation, in various embodiments, the output of CSA 180, CSA_DRV senses the change in capacitance due to drive element 220 and converts it in to an analog voltage signal. The analog voltage signal is then converted into a digital voltage signal by the ADC 190. Next, The AGC loop 160 first extracts information of the amplitude of drive signal from the digital voltage signal. In various embodiments, the AGC 200 may be performed using a rectifier or absolute value operation and then applying averaging and performing a low pass filter on the digital voltage signal from the ADC 200, within the digital domain.

In some embodiments, when the MEMS drive resonator generates signal at lower amplitude than desired amplitude, the amplitude of the signal from CSA 180 is smaller compared to a reference signal provided to the PI Controller 230. In response, in one embodiment, the PI controller block 230 generates output in proportion to the difference of the input signals with respect to a digitized reference value stored in Non-Volatile Memory 240 on the chip or based upon a function of these input signals. Stated differently, in some embodiments, the output of PI CONTROLLER block 230 is proportional to the difference to the reference voltage input to the PI CONTROLLER and the rectified signal amplitude from the ADC 200.

As illustrated in FIG. 1, the output of the PI Controller 230 and AGC block 200 drives the D/A converter 210. In operation, when output of PI CONTROLLER 230 is higher, then D/A converter will provide larger voltage output (higher magnitude drive signal) to the electrostatically driven MEMS driver-resonator (Vac). In response, the displacement generated by the resonator is proportional to the input force and the Q factor of the resonator. E.g. when the Q factor is larger, the responsive displacement is larger. In other words, for a given Q factor, a larger force is associated with a larger displacement of MEMS drive element 160. Additionally, larger displacement of MEMS element provides larger changes in signals, e.g. capacitances for the MEMS gyroscope elements. Thus, as discussed, the AGC loop 160 in FIG. 1 provides a desired signal amplitude for a driving signal in response to the sensed resonance from the MEMS gyroscope. Additionally, the AGC loop 160 maintains the MEMS Gyroscope resonator velocity as desired amplitude.

In various embodiments, the PI CONTROLLER block 230 also provides a differential signal which may be used to "kick-start" or initialize the AGC loop 160. More specifically, initially the PI controller 230 specifies a high output to pump up the charge pump output, especially during a power on event. In contrast, during steady-state operation, a normal mode of operation, an integrator in the PI Controller 230 integrates the output from digitized value of CSA 180 so that noise pulses do not cause undesired changes in the MEMS Gyroscope drive loop 160.

In various embodiments, the sensing mechanism of MEMS gyroscope elements are based on Coriolis force, which is proportional to the vector product of angular motion of gyroscope and the velocity of the MEMS driver resonator 160. Typically, the Coriolis force generates displacement of the MEMS sense element in direction which is orthogonal to the drive velocity and external angular motion. The displacement signal is sensed via sense Charge Sense Amplifier (CSA) 150. The signal at output of sense CSA 250 will have a carrier (drive) signal at the frequency of the resonance (F_RES 150) of drive resonator which will be amplitude modulated by a signal proportional to the angular rate of motion (e.g. F_RES 150+F_RATE 260). In various embodiments, a time-based multiplexer 270 is illustrated that provides data associated with rotation about one primary axis (e.g. x, y or z) to the CSA 250 at a time.

In an embodiment of the present invention, the CSA-sense amplifier 250 is a low noise amplifier. It can be implemented as continuous time or Discrete time amplifier. In the system shown in FIG. 1, the CSA 250 samples single or multiple axes of MEMS sensor. In case of three-axis Gyroscope, the CSA 250 sense multiplexes to receive sample all the 3 axes in time domain. The sampling & multiplexing frequency of the sense CSA 250 is function of drive resonance frequency (e.g. F_RES*3 280 or three times F_RES (for a three-axis solution)). In some embodiments, a programmable gain is provided in the CSA 250 and amplifies the MEMS signal to desired level.

In various embodiments, the drive signal is injected in the sense path and are 90 degrees out of phase and hence termed as Quadrature coupling. A programmable Quadrature cancellation is achieved by using electrostatic quadrature cancellation circuit 285 performed at MEMS sensor. This allows the sense CSA 250 to have increased dynamic range.

In operation, the rate signal (F_RATE) is demodulated from the signal at the output of sense CSA 250. The mixer 290 in the signal path achieves the demodulation by mixing the carrier signal coming out from drive CSA (F_RES) with the composite signal (F_RES+F_RATE) coming from sense-CSA 250. One of the embodiments is a mixer that is implemented as transmission gate that samples and passes the CSA 250 sense output through a low pass filter (LPF) 300. In some embodiments, the output from mixer 290 is a composite signal of (2*F_RES+F_RATE), and the output of LPF 300 outputs the signal at F_RATE. The output is then digitized by the ADC sample & Hold (S&H) 310.

In various embodiments, the Control (Gate) input of the transmission gate is driven by the pulses output by at resonant frequency of MEMS driver resonator. In some embodiments, the Mixer function produces a frequency component at twice the frequency of drive resonator along with a demodulated rate signal from MEMS sensor (2*F_RES+F_RATE). As discussed above, the drive resonator frequency is removed with LPF 300, and the data at the F_RATE is returned.

In various embodiments, MUX 270, mixer 290, and the like are driven at three times the resonator frequency (F_RES*3). To facilitate generation of the F_RES*3 with the proper frequency and the proper phase, a clock generator circuit 320 is used. Input to clock generator 320 is illustrated as F_RES and output is F_RES*3 with a synchronized phase.

In FIG. 1, PLL 330 also generates phase shifted pulses thereby adjusting for both phase lead and lag between signal in drive loop versus signals in sense path.

In various embodiments, a high resolution (e.g. 16 bit) A/D converter (310) converts the demodulated rate signal. The A/D converter 310 typically has input for multiple channels in order to digitize sense signal path for all the channels. In some embodiments, one of the inputs of the A/D converter 310 is from temp sensor 330 on the IC.

The Temp sensor 330 output can be effectively used to compensate for effect of resonator variation with temperature either in analog domain or in digital domain. For example, one of the embodiment can read the temp sensor output which can then be used to select appropriate pulse phases from PLL to compensate for changes in phase occurring due to change in temperature. In some embodiments, temperature compensation can also be applied in digital path with certain programmability.

In FIG. 1, multiple axes (e.g. three axes for 3DOF Gyro) of Gyro signal are multiplexed at an analog to digital converter, ADC1 310. In another embodiment, analog signals from drive CSA 180 may also be multiplexed in the same A/D converter. In yet another embodiment, signals from another sensor such as Accelerometer can also be multiplexed on the same A/D 310 or on a different A/D 312 to make the processing highly area and power efficient. The digital path can have signal processing such as programmable Low Pass Filter to cancel noise outside band of interest. The digital signal path can also have a programmable High Pass Filter (HPF) to eliminate DC component, offset or very low frequency artifact that are not within expected rate signal band, and the like. The digital processing paths are illustrated as Digital Proc. 340 and 350 in FIG. 1.

In some embodiments, the inventors recognized that layout of the Gyroscope MEMS and CMOS is important to achieve optimal performance. To facilitate this, all the out of plane sense signal plates are shielded with metal shield on sides (on same metal layer) as well as on layers below the sense plates. Additionally, a shield may be placed by skipping one or more metal layers to minimize parasitic capacitance. For example, if sense plate is on Metal 6, the shield may be on metal 4 instead of Metal 5 in order to provide more isolation & reduce parasitics.

In various embodiments, the CMOS control and processing circuitry are formed within a semiconductor substrate, and the MEMS portion is formed in a MEMS material layer that is disposed above and bonded to the semiconductor substrate. This monolithic construction provides efficient and reliable integrated MEMS devices.

Figure 2:
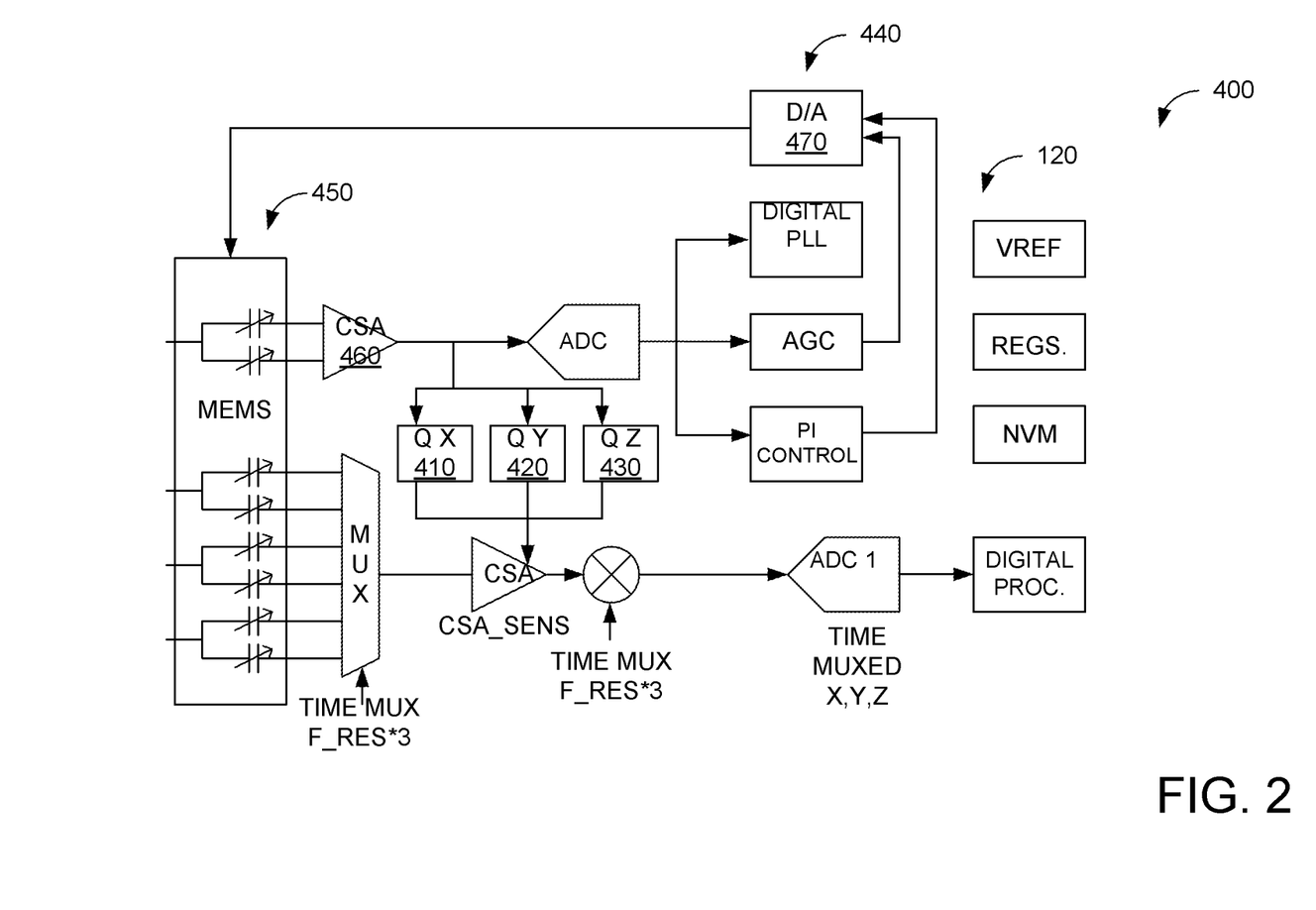
FIG. 2 is a block diagram of various embodiments of the present invention.

FIG. 2 illustrates additional embodiments of the present invention. More specifically, FIG. 2 illustrates portions of MEMS devices that enable quadrature cancellation. Similar to the embodiment illustrated in FIG. 1, FIG. 2 illustrates an integrated MEMS device 400 having CMOS circuitry 440 and MEMS functionality 450. As seen in this example, output from CSA Drive 460 is processed through capacitive DAC (QDAC) 470 to cancel quadrature signal in the sense path. Further, Q_gainX 410, Q_gainY, 420 Q_gainZ 430 provides desired multiplication factor to the drive signal output to cancel the quadrature in MEMS sense path on X,Y,Z axes in case of 3-axis Gyroscope, or the like.

Various concepts are disclosed and enabled by the present disclosure including:

1. Optimized stage architecture to implement ultra-low power 6-axis IMU. The sense path comprises of only single gain stage followed by sampled A/D which allows low power consumptions 2. Demodulation of Coriolis signal implemented through a pass gate implemented mixer which is combined with the Sample & Hold (S/H) or the first stage of A/D converter 3. AGC for Gyro drive is performed by using single analog CSA followed by digital processing 4. Usage of Electrostatic Quadrature cancellation allows the dynamic range of CSA sense to have reduced impact by quadrature 4. In the alternative embodiment of quadrature cancellation, output from CSA Drive is processed through capacitive DAC to perform quadrature cancellation for each axis 5. PLL provides phase shifts to cancel quadrature phase. In another embodiment, the PLL can be Digital PLL 6. Mixer to demodulate Coriolis signal from drive resonant signal performed with simple pass gates 7. Mixer coupled with ADC1 to achieve demodulation as well as second gain function before conversion to digital domain. Maximizing gain before quantization, allows effect of quantization noise to be minimized 8. ADC sharing between multiple sensors. In one embodiment, ADC1 310 for Gyro together with mixer. ADC2 312 may be a single ADC (that is, the same ADC as ADC1 310) and can be multiplexed between Accelerometer, Temp sensor as well Gyro drive signal.

9. In another embodiment, all the 3 ADC shown in FIG. 1 can be multiplexed on single A/D converter 10. Quaternion data processing on Gyro & Accel to provide higher resolution while providing a lower output data rate (ODR). This minimizes I/O power 11. In one embodiment, the D/A in drive loop is implemented as Current Source Array architecture that charges capacitive loads of MEMS. The current source array uses binary weights updated by AGC in drive loop. IN other possible embodiments, the D/A can be implemented as Sigma-Delta DAC, R-2R DAC or other possible variations of D/A architectures.

In various embodiments, a device incorporating a MEMS supporting the features described above may be a smart device such as a phone, tablet or other portable computing device.

Figure 3:
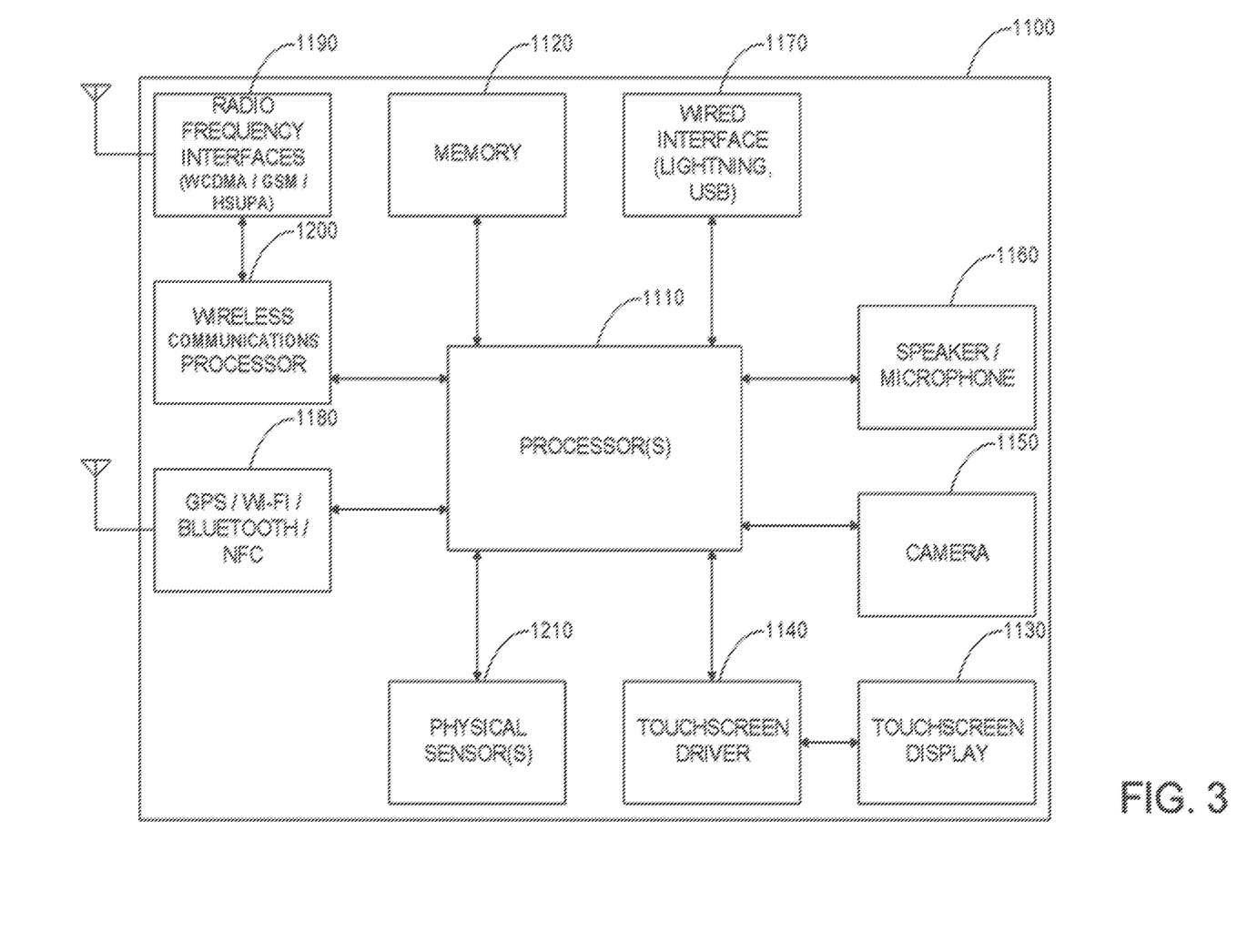
FIG. 3 is a block diagram showing components for various embodiments of the present invention.

FIG. 3 illustrates a functional block diagram of various embodiments of the present invention. In FIG. 3, a computing device 1100 typically includes an applications processor 1110, memory 1120, a touch screen display 1130 and driver 1140, an image acquisition device 1150, audio input/output devices 1160, and the like. Additional communications from and to computing device are typically provided by via a wired interface 1170, a GPS/Wi-Fi/Bluetooth interface 1180, RF interfaces 1190 and driver 1200, and the like. Also included in various embodiments are physical sensors 1210.

In various embodiments, computing device 1100 may be a hand-held computing device (e.g. Apple iPad, Amazon Fire, Microsoft Surface); a smart phone (e.g. Apple iPhone, Motorola Moto series, Google Pixel, Samsung Galaxy S); a portable computer (e.g. netbook, laptop, ultrabook), a media player (e.g. Apple iPod); a reading device (e.g. Amazon Kindle); a fitness tracker (e.g. from Fitbit, Apple Watch, Garmin, or the like); a headset (e.g. Oculus Rift, HTC Vive, Sony PlaystationVR); or the like.

Typically, computing device 1100 may include one or more processors 1110. Such processors 1110 may also be termed application processors, and may include a processor core, a video/graphics core, and other cores. Processors 1110 may be a processor from Apple (e.g. A9), NVidia (e.g. Tegra), Intel (Core), Marvell (Armada), Qualcomm (Snapdragon), Samsung (Exynos), TI, NXP, or the like. In various embodiments, the processor core may be an Intel processor, an ARM Holdings processor such as the Cortex or ARM series processors, or the like. Further, in various embodiments, the video/graphics core may be an AMD graphics processor (e.g. Radeon), Imagination Technologies processor PowerVR graphics, an Nvidia graphics processor (e.g. GeForce), integrated graphics (e.g. Intel) or the like. Other processing capability may include audio processors, interface controllers, and the like. It is contemplated that other existing and/or later-developed processors may be used in various embodiments of the present invention.

In various embodiments, memory 1120 may include different types of memory (including memory controllers), such as flash memory (e.g. NOR, NAND), pseudo SRAM, DDR SDRAM, or the like. Memory 1120 may be fixed within computing device 1100 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, touch screen display 1130 and driver 1140 may be based upon a variety of later-developed or current touch screen technology including resistive displays, capacitive displays, optical sensor displays, electromagnetic resonance, or the like. Additionally, touch screen display 1130 may include single touch or multiple-touch sensing capability. Any later-developed or conventional output display technology may be used for the output display, such as TFT-LCD, OLED, Plasma, electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, image capture device 1150 may include a sensor, driver, lens and the like. The sensor may be based upon any later-developed or convention sensor technology, such as CMOS, CCD, or the like. In various embodiments of the present invention, image recognition software programs are provided to process the image data. For example, such software may provide functionality such as: facial recognition, head tracking, camera parameter control, or the like.

In various embodiments, audio input/output 1160 may include conventional microphone(s)/speakers. In some embodiments of the present invention, three-wire or four-wire audio connector ports are included to enable the user to use an external audio device such as external speakers, headphones or combination headphone/microphones. In various embodiments, voice processing and/or recognition software may be provided to applications processor 1110 to enable the user to operate computing device 1100 by stating voice commands.

Additionally, a speech engine may be provided in various embodiments to enable computing device 1100 to provide audio status messages, audio response messages, or the like.

In various embodiments, wired interface 1170 may be used to provide data transfers between computing device 1100 and an external source, such as a computer, a remote server, a storage network, another computing device 1100, or the like. Such data may include application data, operating system data, firmware, or the like. Embodiments may include any later-developed or conventional physical interface/protocol, such as: USB, micro USB, mini USB, Firewire, Apple Lightning connector, Ethernet, POTS, or the like. Additionally, software that enables communications over such networks is typically provided.

In various embodiments, a wireless interface 1180 may also be provided to provide wireless data transfers between computing device 1100 and external sources, such as computers, storage networks, headphones, microphones, cameras, or the like. As illustrated in FIG. 3, wireless protocols may include Wi-Fi (e.g. IEEE 802.11 a/b/g/n, WiMax), Bluetooth, IR, near field communication (NFC), ZigBee and the like.

GPS receiving capability may also be included in various embodiments of the present invention, however is not required. As illustrated in FIG. 3, GPS functionality is included as part of wireless interface 1180 merely for sake of convenience, although in implementation, such functionality is currently performed by circuitry that is distinct from the Wi-Fi circuitry and distinct from the Bluetooth circuitry.

Additional wireless communications may be provided via RF interfaces 1190 and drivers 1200 in various embodiments. In various embodiments, RF interfaces 1190 may support any future-developed or conventional radio frequency communications protocol, such as CDMA-based protocols (e.g. WCDMA), GSM-based protocols, HSUPA-based protocols, or the like. In the embodiments illustrated, driver 1200 is illustrated as being distinct from applications processor 1110. However, in some embodiments, these functionalities are provided upon a single IC package, for example the Marvel PXA330 processor, and the like. It is contemplated that some embodiments of computing device 1100 need not include the RF functionality provided by RF interface 1190 and driver 1200.

FIG. 3 also illustrates computing device 1100 to include physical sensors 1210. In various embodiments of the present invention, physical sensors 1210 are multi-axis Micro-Electro-Mechanical Systems (MEMS) based devices being developed by mCube, the assignee of the present patent application. Physical sensors 1210 developed by mCube, the assignee of the present patent application, currently include very low power three-axis sensors (linear, gyro or magnetic); ultra-low jitter three-axis sensors (linear, gyro or magnetic); low cost six-axis motion sensor (combination of linear, gyro, and/or magnetic); ten-axis sensors (linear, gyro, magnetic, pressure); and various combinations thereof. Various embodiments may include a gyroscope, or other device incorporating digital control feedback paths described above.

In various embodiments, any number of future developed, or current operating systems may be supported, such as iPhone OS (e.g. iOS), Windows, Google Android, or the like. In various embodiments of the present invention, the operating system may be a multi-threaded multi-tasking operating system. Accordingly, inputs and/or outputs from and to touch screen display 1130 and driver 1140 and inputs/or outputs to physical sensors 1210 may be processed in parallel processing threads. In other embodiments, such events or outputs may be processed serially, or the like. Inputs and outputs from other functional blocks may also be processed in parallel or serially, in other embodiments of the present invention, such as image acquisition device 1150 and physical sensors 1210.

FIG. 3 is representative of one computing device 1100 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 3. For example, in various embodiments, computing device 1100 may lack image acquisition unit 1150, or RF interface 1190 and/or driver 1200, or GPS capability, or the like. Additional functions may also be added to various embodiments of computing device 1100, such as a physical keyboard, an additional image acquisition device, a trackball or trackpad, a joystick, or the like. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. An integrated MEMS device comprises:
   a MEMS gyroscope comprising:
      a proof mass;
      a plurality of drive capacitors coupled to the proof mass, wherein the plurality of drive capacitors is configured to receive a drive signal, wherein the plurality of drive capacitors is configured to cause the proof mass to resonate in response to the drive signal and configured to produce an output signal comprising a resonant frequency and a first phase; and
      a plurality of sense capacitors coupled to the proof mass including a first set of sense capacitors configured to output first data associated with a first rotational axis and a second set of sense capacitors configured to output second data associated with a second rotational axis, both in response to physical perturbations to the integrated MEMS device, wherein the first data comprises movement data corresponding to the resonant frequency and a data frequency; and
   CMOS circuits coupled to and disposed below the MEMS gyroscope, wherein the CMOS circuits comprise:
      a first portion coupled to the plurality of drive capacitors, wherein the first portion is configured to generate the drive signal in response to the output signal;
      a second portion coupled to the plurality of drive capacitors, wherein the second portion is configured to determine a sampling signal in response to the output signal, wherein the sampling signal comprises a sampling frequency that is a multiple of the resonant frequency, and wherein the sampling signal comprises a phase determined according to the first phase;

a multiplexer coupled to the first set of sense capacitors, the second set of sense capacitors, and the second portion, wherein the multiplexer is configured to output multiplexed data comprising the first data and the second data time multiplexed in response to the sampling signal; and a processing portion coupled to the multiplexer and to the second portion, wherein the processing portion is configured to reduce the resonant frequency from the multiplexed data and output processed data comprising the first data and the second data time multiplexed in response to the sampling signal.

2. The device of claim 1, wherein the CMOS circuits further comprises:

an analog to digital converter (ADC) coupled to the processing portion, wherein the ADC is configured to convert the processed data into digital data; and a digital processing portion coupled to the ADC, wherein the digital processing portion is configured to determine a digital representation of the first data and a separate digital representation of the second data in response to the digital data.

3. The device of claim 2, wherein the CMOS circuits further include an output bus coupled to the digital processing portion and configured to output the digital representation of the first data and the digital representation of the second data.

4. The device of claim 1, wherein the plurality of sense capacitors coupled to the proof mass further includes a third set of sense capacitors configured to output third data associated with a third rotational axis; and wherein the sampling frequency is three times the resonant frequency.

5. The device of claim 1, wherein the processing portion comprises:

charge sense amplifier (CSA) coupled to the multiplexer, wherein the CSA is configured to output sensed data in response to the multiplexed data;

a mixer coupled to the CSA, wherein the mixer is configured to output mixed data in response to the sensed data and to the sampling signal; and a low pass filter coupled to the mixer, wherein the low pass filter is configured to output the processed data in response to the mixed data, wherein the processed data is generated using the sampling frequency.

6. The device of claim 1, wherein the first portion comprises:

charge sense amplifier (CSA) coupled to the plurality of drive capacitors, wherein the CSA is configured to output sensed data in response to the output signal;

an analog to digital converter (ADC) coupled to the CSA, wherein the ADC is configured to convert the sensed data into digital data; and an analog gain controller (AGC) coupled to the ADC, wherein the AGC is configured to generate a gain component of the drive signal in response to the digital data.

7. The device of claim 1, wherein the first portion further comprises a controller coupled to the ADC, wherein the controller is configured to generate a phase component of the drive signal in response to the digital data.

8. A controller for a MEMS gyroscope, the controller comprising:

a first portion coupled to a plurality of drive capacitors of the MEMS gyroscope, wherein the first portion is configured to generate a drive signal in response to an output signal from the plurality of drive capacitors, wherein the output signal comprises a resonant frequency and a first phase;

a second portion coupled to the plurality of drive capacitors, wherein the second portion is configured to determine a sampling signal in response to the output signal, wherein the sampling signal comprises a sampling frequency that is a multiple of the resonant frequency of the output signal, and wherein the sampling signal comprises a phase determined according to the first phase;

a multiplexer coupled to a first set of sense capacitors of the MEMS gyroscope, a second set of sense capacitors of the MEMS gyroscope and the second portion, wherein the multiplexer is configured to output multiplexed data comprising first data signals from the first set of sense capacitors and second data signals from the second set of sense capacitors multiplexed in response to the sampling signal; and a processing portion coupled to the multiplexer and to the second portion, wherein the processing portion is configured to reduce a component of the multiplexed data corresponding to the resonant frequency of the output signal from the multiplexed data and configured to output processed data signals comprising the first data signals and the second data signals time multiplexed in response to the sampling signal.

9. The controller of claim 8 further comprising:

an analog to digital converter (ADC) coupled to the processing portion, wherein the ADC is configured to convert the processed data signals into digital data signals; and a digital processing portion coupled to the ADC, wherein the digital processing portion is configured to determine a digital representation of the first data and a separate digital representation of the second data in response to the digital data signals and to the sampling signal.

10. The controller of claim 9, further comprising an output bus coupled to the digital processing portion and configured to output the digital representation of the first data and the digital representation of the second data.

11. The controller of claim 8 wherein the multiplexer is further coupled to a third set of sense capacitors of the MEMS gyroscope; and wherein the sampling frequency is three times the resonant frequency.

12. The controller of claim 8 wherein the processing portion comprises:

charge sense amplifier (CSA) coupled to the multiplexer, wherein the CSA is configured to output sensed data in response to the multiplexed data;

a mixer coupled to the CSA, wherein the mixer is configured to output mixed data in response to the sensed data and to the sampling signal; and a low pass filter coupled to the mixer, wherein the low pass filter is configured to output the processed data in response to the mixed data, wherein the processed data is generated using the sampling frequency.

13. The controller of claim 8 wherein the first portion comprises:

charge sense amplifier (CSA) coupled to the plurality of drive capacitors, wherein the CSA is configured to output sensed data in response to the output signal;

an analog to digital converter (ADC) coupled to the CSA, wherein the ADC is configured to convert the sensed data into digital data; and an analog gain controller (AGC) coupled to the ADC, wherein the AGC is configured to generate a gain component of the drive signal in response to the digital data.

14. The controller of claim 8, wherein the first portion further comprises a controller coupled to the ADC, wherein the controller is configured to generate a phase component of the drive signal in response to the digital data.

15. A method for a controller for a MEMS gyroscope, the method comprising:
    generating a drive signal comprising a resonant frequency and a first phase, in response to an output signal from a plurality of drive capacitors of the MEMS gyroscope;
    providing the drive signal to an input of the plurality of drive capacitors of the MEMS gyroscope;
    determining, using the output signal, a sampling signal comprising a sampling frequency and a phase determined according to the first phase, wherein the sampling frequency is a multiple of the resonant frequency;
    receiving first data signals from a first set of sense capacitors of the MEMS gyroscope;
    receiving second data signals from a second set of sense capacitors of the MEMS gyroscope;
    producing multiplexed data comprising a time multiplexed output comprising a portion of the first data signals and a portion of the second data signals; and
    producing, by reducing a component of the multiplexed data corresponding to the resonant frequency from the multiplexed data, processed data comprising the first data and the second data time multiplexed in response to the sampling signal.

16. The method of claim 15, further comprising:
    converting, with an analog to digital converter (ADC), the processed data into digital data signals; and
    determining, with a digital processing portion, a digital representation of the first data and a separate digital representation of the second data in response to the digital data signals and to the sampling signal.

17. The method of claim 15, further comprising:
    receiving third data signals from a third set of sense capacitors of the MEMS gyroscope;
    producing the multiplexed data signals comprising the time multiplexed output further comprising a portion of the third data signals;
    wherein the sampling frequency is three times the resonant frequency.

18. The method of claim 15, wherein producing the processed data comprises:
    producing sensed data by sensing with a charge sense amplifier the multiplexed data;
    producing mixed data by combining, with a mixer, the sensed data and the sampling signal; and
    filtering, with a low pass filter, the mixed data to produce the processed data.

19. The method of claim 15, further comprising:
    producing sensed data by sensing, with a charge sense amplifier, the output signal;
    converting, using an analog to digital converter (ADC), the sensed data into digital data; and
    generating, using an analog gain controller (AGC) and the digital data, a gain component of the drive signal.

20. The method of claim 19, further comprising generating a phase component of the drive signal in response to the digital data.

* * * * *